United States Patent [19]

Goodrich

[11] Patent Number: 4,559,128

[45] Date of Patent: Dec. 17, 1985

[54] METHOD FOR PRODUCING INDUSTRIAL ASPHALTS

[75] Inventor: Judson E. Goodrich, San Rafael, Calif.

[73] Assignee: Chevron Research Company, San Francisco, Calif.

[21] Appl. No.: 646,336

[22] Filed: Aug. 31, 1984

[51] Int. Cl.$^4$ ............................ C10C 3/00; C08H 13/00
[52] U.S. Cl. ............................................ 208/22; 208/40; 208/39; 208/44; 106/273 R; 106/274
[58] Field of Search ............... 208/22, 40, 39, 44; 106/273 R, 274

[56] References Cited

U.S. PATENT DOCUMENTS

| | | | |
|---|---|---|---|
| 1,092,386 | 4/1914 | Eberhardt et al. | 208/22 |
| 1,968,746 | 7/1934 | Condrup | 208/44 |
| 2,093,450 | 9/1937 | Jacobsohn | 208/22 |
| 2,115,306 | 4/1938 | Hampton et al. | 208/22 |
| 2,179,208 | 11/1939 | Burk | 208/44 |
| 2,217,919 | 10/1940 | Rostler | 208/22 |
| 2,748,057 | 5/1956 | Goren | 208/22 |
| 3,089,842 | 5/1963 | Stratton | 208/44 |
| 3,294,678 | 12/1966 | Gleim | 208/309 |
| 3,751,278 | 8/1973 | Alexander | 208/39 |
| 3,839,190 | 10/1974 | Frese et al. | 208/22 |
| 3,960,585 | 6/1976 | Gaw | 208/44 |

FOREIGN PATENT DOCUMENTS

| | | | |
|---|---|---|---|
| 81520 | 7/1978 | Japan | 208/40 |
| 1028696 | 7/1983 | U.S.S.R. | 106/274 |

*Primary Examiner*—D. E. Gantz
*Assistant Examiner*—Helane Myers
*Attorney, Agent, or Firm*—S. R. LaPaglia; R. C. Gaffney; J. J. DeYoung

[57] ABSTRACT

Disclosed is a one-step method of producing an industrial asphalt from a bituminous material which comprises mixing together without air-blowing:

(a) a feed material comprising a bituminous material having a viscosity of at least 50 centistokes at 350 degrees Fahrenheit and wherein the feed petroleum residuum forms a single phase when mixed with 5 percent of 98 percent sulfuric acid; and (b) from about 0.1 to 20.0 percent by weight of sulfuric acid, said mixing being done at a temperature in the range of 351 to 600 degrees Fahrenheit, whereby the softening point of the feed is substantially increased and the penetration is significantly decreased.

7 Claims, 1 Drawing Figure

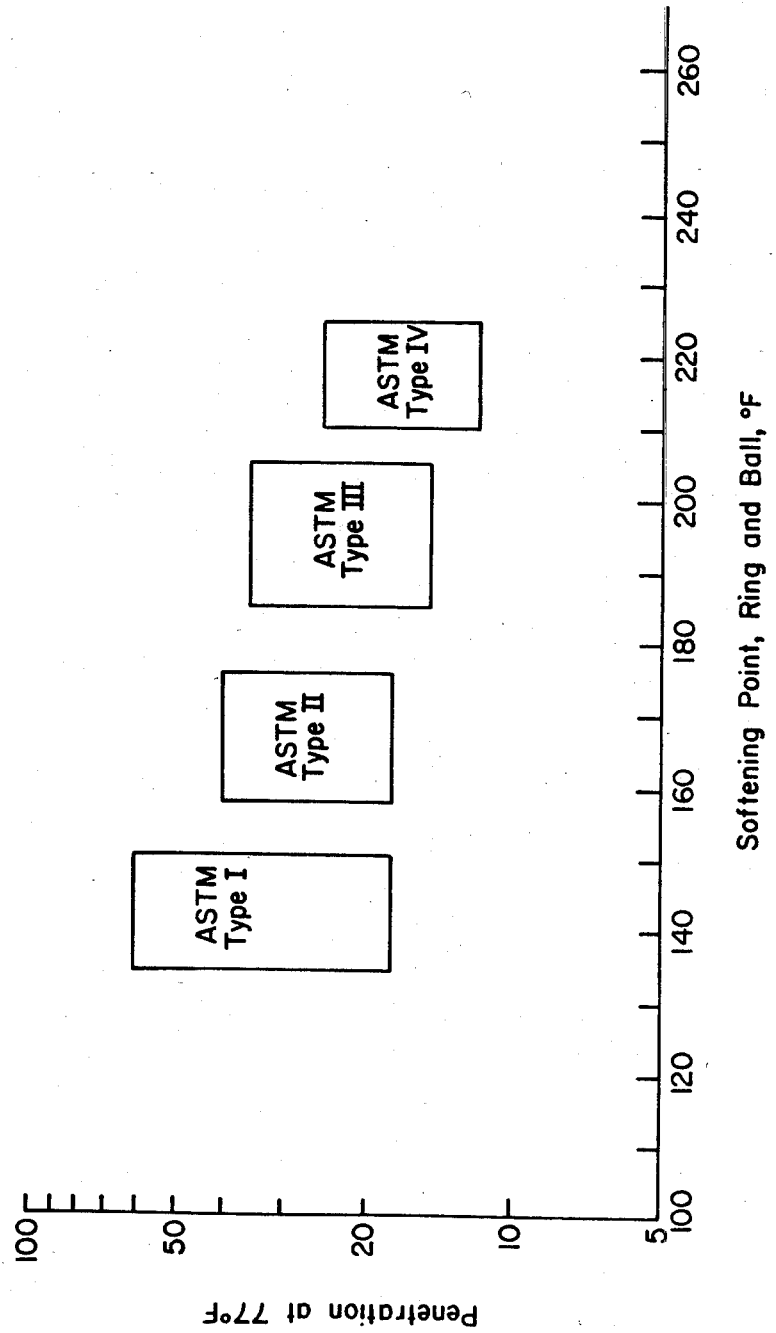

METHOD FOR PRODUCING INDUSTRIAL ASPHALTS

BACKGROUND OF THE INVENTION

The present invention relates to a method for modifying the physical properties of bituminous materials and to asphalt compositions obtained therefrom. More particularly, the present invention relates to a method of producing industrial asphalts. Industrial asphalts have many uses but are particularly useful in roofing applications.

BRIEF DESCRIPTION OF DRAWINGS

FIG. 1 is a softening point-penetration plot for various industrial asphalt grades.

The physical properties of asphalt vary over a wide range. The four rectangles in FIG. 1 outline the properties of Types I-IV industrial asphalts as defined by the American Society for Testing and Materials (ASTM-D312). The plot illustrates the tremendously varying properties required of industrial asphalts for different applications. Industrial asphalts have softening points above 135 degrees Fahrenheit.

Properties of bituminuous materials may be modified by such well-known treating means as solvent extraction, air-blowing and the like.

Air-blowing processes using catalysts are known in the art for making industrial asphalts. However, air-blowing processes require complex and expensive air-blowing equipment which must meet ever more stringent air pollution regulations. Furthermore, air-blowing requires long processing times on the order of hours.

U.S. Pat. No. 3,751,278 discloses a process for treating asphalts without air-blowing using phosphoric acids having an H3PO4 equivalent of greater than 100 percent. The compositions produced by this process are directed to paving asphalts particularly useful in highway construction and maintenance. Paving asphalts usually have softening points below 135 degrees Fahrenheit and penetrations from 20 to 300 dmm at 77 degrees Fahrenheit. This patented process is particularly directed to treating asphalts to substantially increase the viscosity without a significant decrease in penetration.

U.S. Pat. No. 2,179,208 teaches a process for making asphalt which comprises air-blowing in the absence of any catalyst at a temperature of 300 to 500 degrees Fahrenheit for 1 to 30 hours followed by a second step of heating that material to a temperature greater than 300 degrees Fahrenheit with a small amount of polymerizing catalysts. The catalysts include sulfuric acid, ferric chloride, BF3, etc. Using small amounts of these catalysts, products with melting points of 140 degrees Fahrenheit or less were produced. The patent teaches that overall processing times are significantly reduced using this two-step process.

It is well known that sulfuric acid can be used to form an asphaltic-acid sludge which is then separated as described in U.S. Pat. Nos. 1,968,746 and 3,294,678.

Sulfonated asphalt is a known product formed from asphalt by reaction with sulfuric acid followed by separation, drying, and grinding as described in U.S. Pat. No. 3,089,842.

One object of the present invention is to produce an industrial asphalt in a simple one-step process without any prior air-blowing treatment of the bituminous material feed stock or any post air-blowing treatment of the asphalt formed.

A second object of the present invention is to provide a process for producing industrial asphalts where treatment times are very short, in the order of 5 to 25 minutes or less.

Another object of the present invention is to provide a process which can utilize as a feed, bituminous materials which heretofore could not be used in making industrial asphalts by the prior art air-blowing process without the addition of substantial amounts of lower boiling hydrocarbons.

SUMMARY OF THE INVENTION

The present invention involves a one-step method of producing an industrial asphalt from a bituminous material which comprises mixing together without air-blowing:

(a) a feed comprising a bituminous material having a viscosity of at least 50 centistokes at 350 degrees Fahrenheit and wherein the feed bituminous material forms a single phase when mixed with 5 percent of 98 percent sulfuric acid; and (b) from about 0.1 to 20.0 percent by weight of sulfuric acid, said mixing being done at a temperature in the range of 351 to 600 degrees Fahrenheit, whereby the softening point of the feed is substantially increased and the penetration is significantly decreased.

DETAILED DESCRIPTION OF THE INVENTION

The industrial asphalts of the present invention are prepared by starting with particular bituminous materials and mixing them without air-blowing with sulfuric acid to produce industrial asphalt. The product industrial asphalts of the present invention are formed in a one-step process without any air-blowing or other oxidation treatment of the starting material prior to or after treatment with sulfuric acid.

Feeds suitable for use in the present invention called bituminous materials ("Bituminous Materials: Asphalts, Tars, and Pitches" Vol. I, A. J. Hoiberg, Editor, 1964, Interscience, pages 2-5, the disclosure of which is incorporated herein by reference) can be of varied character. Many petroleum residua (also known as fluxes) remaining following the separation of vaporizable hydrocarbons from oil fractions or any relatively high molecular weight extract obtained from petroleum refining or from naturally occurring hydrocarbons, including tar and Gilsonite, can be used.

It is critical for the one-step process of the present invention that the bituminous material feed stock have the following two characteristics:

(1) A viscosity of at least 50 centistokes when measured at 350 degrees Fahrenheit; and (2) Forms a single phase when mixed with 5 percent of 98 percent sulfuric acid. It has been surprisingly found that feed stocks not meeting this critical parameter will not form industrial asphalts utilizing the simple one-step process of the present invention.

Generally the feed will have an initial viscosity at 350 degrees Fahrenheit of at least 50 cSt. In the process of the present invention, the softening point is substantially increased and the penetration point is significantly decreased thereby producing industrial asphalts. Generally, the feed flux will have a softening point in the range of 100 to 200 degrees Fahrenheit, preferably 110 to 150 degrees Fahrenheit a penetration in the range 30 to 150, preferably 40 to 100 dmm at 77 degrees Fahrenheit. Generally, the viscosity of the feed is 50 to 200 cSt and more preferably 65 to 180 cSt. Particularly preferred feed materials include: petroleum distillation residue, a blend of hard petroleum distillation residue, a blend of Gilsonite, a blend of pitch from a solvent deasphalting process, a blend of pitch from a supercritical solvent deasphalting process. Any of the above blends can contain petroleum distillate or vegetable oil diluents.

One surprising feature of the present invention resides in the finding that by the critical selection of the bituminous material feed, once can produce industrial asphalts in a simple one-step process without prior or post-treatments involving air-blowing, characteristic of prior art processes.

The bituminous material feed stock is mixed with 0.1 to 20.0 percent by weight, perferably 0.2 to 12.0 percent and more preferably more than 0.5 and less than 10.0 percent by weight of sulfuric acid. The quantity of sulfuric acid to be utilized in the present invention is inversely proportional to the viscosity of the feed material. Thus, feed stocks having low viscosities, e.g., about 60 cSt. at 350 degrees Fahrenheit, require larger amounts of acid, e.g., about 8%. On the other hand, feed stocks having high viscosities, e.g., about 200 cSt. at 350 degrees Fahrenheit, need relatively lower amounts of acid, e.g., about 0.5 to 2%. Sulfuric acid is readily available commercially at 98 percent concentration.

The treating method of the present invention comprises heating the feed stock to a temperature in the range 351 to 600 degrees Fahrenheit, preferably 400 to 500 degrees Fahrenheit to facilitate mixing and reacting with the sulfuric acid.

After the starting material has been heated to a temperature sufficient for mixing purposes, at least above its softening point, the sulfuric acid is most often introduced into the hot feed with continuous agitation. Agitation is usually supplied by mechanical means and must be adequate to disperse the sulfuric acid intimately throughout the asphalt. A preferred alternative process for mixing involves the use of in-line blending and a static mixer which further facilitate very short mixing and reaction time.

The present method of treating bituminous materials does not include air-blowing of the feed stock during mixing or as a part of the treatment, the treatment being carried out without passing air through the material either before, during or after treatment as is done in conventional prior art processes.

The entire one-step acid treatment process of the present invention requires from 1 to 30 minutes or more. Longer process times can also be utilized but are not necessary and are less economical. Preferably, the acid treatment time ranges from 5 to 25 minutes. Not included in the treatment time is the time required to initially heat the petroleum residue to treatment temperature.

In the process of the present invention the softening point of the feed asphalt is substantially increased and the penetration is significantly decreased. The amount of increase in the softening point and decrease in penetration will vary greatly depending upon the properties of the feed and the amount of sulfuric acid used and the mixing temperature. Generally, it is desired to substantially increase the softening point by 50 to 120 degrees Fahrenheit, preferably 70 to 100 degrees Fahrenheit and significantly lower the penetration at 77 degrees Fahrenheit by 20 to 80 dmm, preferably 30 to 60 dmm.

The product industrial asphalts of the present invention will preferably have a softening point of 130 to 240 degrees Fahrenheit, and more preferably 200 to 235 degrees Fahrenheit with a penetration at 77 degrees Fahrenheit from 10 to 70 dmm, preferably 12 to 30 dmm.

To further describe and to exemplify the present invention, the following examples are presented. These examples are in no manner to be construed as limiting the present invention. In the following examples the viscosity was determined using ASTM D2170, the penetration of ASTM D5, and softening point by ASTM D2398. Each feed stock was tested for compatibility with sulfuric acid by mixing 100 grams of asphalt with 5 grams of 98 percent sulfuric acid at 450 degrees Fahrenheit for 15 minutes and then visually checking whether it separated into two phases. If it separated into two phases, it fails the test and will not form an industrial asphalt using the one-step process of the present invention.

EXAMPLES

Example 1

A 200 g sample of a 75/25 blend of vacuum distilled asphalt from California Coastal crude oil and a petroleum gas oil distillate having a penetration at 77 degrees Fahrenheit of 65 dmm, a viscosity of 212 degrees Fahrenheit of 4245 cSt, a viscosity at 350 degrees Fahrenheit of 80 cSt, and a ring and ball softening point of 123 degrees Fahrenheit, was heated to 325 degrees Fahrenheit with slow stirring and nitrogen injection. To the asphalt was slowly added 5.4 ml (9.9 g) of 98% sulfuric acid. Stirring speed was increased to about 850 rpm and the temperature was raised to 450 degrees Fahrenheit. Stirring with nitrogen injection was continued for 20 minutes. The product had a penetration at 77 F. of 16 dmm, a viscosity at 350 degrees Fahrenheit of 991 cSt and a softening point of 217 degrees Fahrenheit.

Example 2-4

The procedure of Example 1 was followed using other feed stocks or fluxes. Table I shows the properties of various feeds, experimental conditions, and the results.

TABLE I

| EXAMPLE NO. | Feed Type[1] | 98% Sulfuric Acid Wt. % | Product Properties | | | |
|---|---|---|---|---|---|---|
| | | | Temp F. | Pen[2] dmm | S.P.[3] F. | Vis.[4] cSt |
| 2 | Calif.[5] | 6.0 | 450 | 12 | 244 | 2580 |
| 3 | Gilsonite | 0.5 | 400 | 36 | 201 | 426 |
| 4 | Gilsonite | 1.0 | 400 | 33 | 226 | 3304 |

[1]Feed stock description:
(a) Calif. = 75/25 California Coastal Crude Residue/petroleum Gas Oil Distillate
(b) Gilsonite = 50/50 Gilsonite/Petroleum Gas Oil Distillate having a viscosity of 162 cSt at 350 F.
[2]Penetration in decimillimeters(dmm) measured at 77 F.
[3]Softening point, using ring and ball method
[4]Viscosity at 350 F. in centistokes (cSt)
[5]Same Calif. asphalt as in Example 1

What is claimed is:
1. A one-step method of producing an industrial asphalt from a bituminous material which comprises mixing together without air-blowing:
   (a) a feed material consisting essentially of a bituminous material having a viscosity of at least 50 centi- stokes at 350° F. and wherein the feed bituminous material forms a single phase when mixed with 5 percent of 98 percent sulfuric acid; and (b) from about 0.1 to 20.0 percent by weight of sulfuric acid, said mixing being done at a temperature in the range of 351° to 600° F., whereby the softening point of the feed is substantially increased by 50° to 120° F. and the penetration is significantly decreased by 20 to 80 dmm.

2. The method of claim 1 wherein the softening point of the feed is increased by 70 to 100 degrees Fahrenheit and the penetration is decreased by 30 to 60 dmm.

3. The method of claim 2 wherein said mixing is carried out in 5 to 25 minutes.

4. The method of claim 3 wherein the amount of sulfuric acid is in the range of 0.2 to 12 percent by weight.

5. The method of claim 4 wherein the industrial asphalt has a softening point in the range 130 to 240 degrees Fahrenheit and a penetration in the range 10 to 70 dmm at 77 degrees Fahrenheit.

6. The method of claim 4 wherein the industrial asphalt has a softening point in the range 200 to 235 degrees Fahrenheit and a penetration in the range 12 to 30 dmm at 77 degrees Fahrenheit.

7. A one-step method of producing an industrial asphalt from a petroleum residuum which comprises mixing together without air-blowing:

(a) a feed material consisting essentially of a petroleum residuum having a viscosity of 65 to 180 centistokes at 350° F. and wherein said feed forms a single phase when mixed with 5 percent of 98 percent sulfuric acid; and (b) from more than 0.5 to less than 10 percent by weight of a 98 weight percent sulfuric acid, said mixing being done at a temperature in the range of 400° to 500° F. for from 5 to 25 minutes; whereby the softening point of the asphalt is substantially increased by 70° to 100° F. and the penetration is significantly decreased by at least 30 to 60 dmm at 77° F. thereby producing an industrial asphalt having a softtening point in the range 200° to 235° F. and a penetration of 12 to 30.

* * * * *